United States Patent

[11] 3,604,259

| [72] | Inventors | Allan B. Heinsohn<br>Valley Cottage;<br>Donald M. Neary, Pearl River, both of, N.Y. |
|---|---|---|
| [21] | Appl. No. | 826,772 |
| [22] | Filed | May 2, 1969 |
| [45] | Patented | Sept. 14, 1971 |
| [73] | Assignee | Rosemount Engineering Company<br>St. Eden, Prairie, Minn. |

[54] ANGLE OF ATTACK MEASURING DEVICE WITH ADJUSTABLE AIRFOIL
25 Claims, 9 Drawing Figs.

| [52] | U.S. Cl. | 73/180, 244/82 |
| [51] | Int. Cl. | G01c 21/00 |
| [50] | Field of Search | 73/180, 178; 244/77 D, 82 |

[56] References Cited
UNITED STATES PATENTS

| 3,069,906 | 12/1962 | Eiland, Jr. | 73/180 |
| 3,190,115 | 6/1965 | Heinsohn | 73/180 |
| 3,474,669 | 10/1969 | Carter et al. | 73/18 X |

Primary Examiner—Donald O. Woodiel
Attorney—Dugger, Peterson, Johnson & Westman

ABSTRACT: An angle of attack measuring device is mounted on an aircraft in the airflow-deflection path of an airfoil. The airfoil is operatively secured to the aircraft at a location spaced from the wing. The relative angular position of the airfoil is controllably variable to adapt the operation of the angle of attack measuring system to different flight conditions of the aircraft.

PATENTED SEP 14 1971

INVENTORS
ALLAN B. HEINSOHN
DONALD M. NEARY
BY
James and Franklin
ATTORNEY

INVENTORS
ALLAN B. HEINSOHN
DONALD M. NEARY
BY
ATTORNEY

ANGLE OF ATTACK MEASURING DEVICE WITH ADJUSTABLE AIRFOIL

The present invention relates to a system for sensing and indicating the angle of attack of an aircraft, and particularly to a system which provides a reliable and easily comprehended indication of proximity to a stall condition for a variety of flight conditions.

In a safe operation of an aircraft it is most desirable that the pilot have an indication of the angle of attack of his aircraft, that is, the angle that the wing makes with respect to the direction of the oncoming air. A knowledge of the angle of attack is of importance to the pilot to enable him to know whether sufficient lift is being developed at the airspeed at which the aircraft is operating, and is particularly significant when the aircraft is in an approach maneuver just prior to landing at which time velocity is reduced, angle of attack is increased and thrust or power is removed.

In U.S. Pat. No. 3,190,115 which issued on June 22, 1965, entitled "Angle of Attack Measuring Device", a device is disclosed in which a vane, which is sensitive to the direction of airflow, is mounted adjacent the leading edge of an aircraft wing in the airflow-deflection area adjacent that edge. As a result of this location of the vane with respect to the wing, the angular movement of the vane caused by the airflow thereover is related to, but is considerably greater than, the actual change in the aircraft angle of attack. The vane is operatively connected to an indicator in the cockpit to provide a display of its relative position, and thus of the aircraft angle of attack. As a result of this effectively magnified indication of the position of the vane, the angle of attack is measured and displayed in a more accurate and sensitive manner.

While this device has proven to be highly effective for its intended purpose on aircraft on which the vane can be mounted on the leading edge of the wing, there are several factors which may be present either singly or in combination for a particular aircraft that render it unfeasible, if not impossible, to mount the vane on the wing in the desired manner.

For example, in some aircraft the area covered by the propeller is relatively large so that it would be difficult to mount the vane on the wing in a position at which it is not significantly affected by the propeller-influenced airflow. Furthermore, on aircraft with wings having extremely thin leading edge sections, or wings of a solid as opposed to hollow construction, it is physically difficult to mount the vane on the wing in the manner desired for optimum operation. Problems in the wing mounting of the vane may also arise due to possible interference with the wing deicing system and with armament and stores which may, as is common, be contained in the wing.

Airplane wings are also commonly provided with leading edge devices such as slats that are extended out therefrom during operation of the airplane at reduced airspeeds. The extending of such slats from the wing modifies the basic wing camber and the airflow over the wing and thus causes a variation of the angular position of the indicating vane for the same angle of attack. This would produce an erroneous angle of attack indication. Apart from these structural problems, there are also operational problems. It is the pilot's main concern to maintain his craft aloft for all flight conditions, and for this reason he must be aware of how he must fly the aircraft to ensure that it will not stall. At present, the pilot is provided with tables and charts which, when properly interpreted, inform the pilot of the minimum airspeed and maximum angle of attack required to prevent stall for a specified load condition. To avoid a stall condition that information must be constantly reexamined and reinterpreted with changing load conditions and, more significantly, with other flight parameters that may alter the relationship between airspeed, angle of attack and stall condition.

The pilot is thus forced to rely heavily on his judgment and experience to fly his aircraft at proper speeds and flight conditions to avoid stall. No instrumentation is as yet available which is able to present the pilot with a single, easily read indication of percent of stall condition for any flight condition of the aircraft.

An indication of the aircraft angle of attack provides the pilot with a general indication of how near his aircraft is to a stall condition. There is, however, no absolute correlation between angle of attack and percent of stall for all conditions of flight. That correlation is in fact significantly affected by other flight conditions, such as engine thrust and flap position, each of which separately modifies the lift produced on the aircraft for a given airspeed and angle of attack. Changes in flap position change the camber of the wing and changes in thrust increase the net lift on the wing. In other words, for changes in these flight conditions, different angles of attack are required to insure a sufficient coefficient of lift on the aircraft wings to prevent stall. In the device disclosed in the aforementioned patent, as well as in the other known angle of attack measuring and indicating devices, there is no provision made for adjusting or adapting the angle of attack measuring system to these different aircraft flight conditions. As a result the pilot has been forced to interpret the indicated angle of attack data to conform that data to his flight conditions and other factors, such as load. The time and possibility of human error inherent in such interpretations make them undesirable, but for want of better instrumentation such interpretations have in the past been unavoidable.

Angle of attack information is generally considered to be more valuable to the pilot if it is presented to him in terms of percent of stall rather than as a numerical value of that angle. In that way the pilot is provided with a maximum amount of critical information by a single observation. The display of that information is in a form where it need not be interpreted and modified for particular flight conditions, but where those conditions have already automatically been taken into account, represents a significant step forward in aircraft instrumentation.

It is an object of the present invention to provide a device capable of providing to the pilot of an aircraft a single, easily interpreted indication of percent of stall of the aircraft.

It is a further object of the present invention to provide a device for use in an aircraft which is capable of providing an improved indication of proximity to a stall condition based on an indication of the aircraft's angle of attack.

It is another object of the present invention to provide a device for providing an indication of percent of stall which is automatically corrected for significant changes in flight conditions of the aircraft, such as changes in flap position and thrust.

It is also an object of the present invention to provide an angle of attack indicator for use on an aircraft which provides increased accuracy and sensitivity in its operation, and which can be mounted at any convenient location on the aircraft.

It is a further object of the present invention to provide an angle of attack indicator which can be mounted on the aircraft at a location remote from the aircraft wing, and which provides an effective magnified indication of the aircraft angle of attack.

It is another object of the present invention to provide an angle of attack indicator for use on an aircraft, which can be modified for different flight conditions of the aircraft to provide a more meaningful indication of the angle of attack.

In accordance with the present invention, the measuring vane, which is sensitive to the direction of airflow, is mounted on the aircraft in the airflow-deflection path of an airfoil which may be positioned separate from the wing at any appropriate location on the aircraft. As a result, changes in the indication of angle of attack provided by the sensing of the vane position is related to, but is considerably greater than the actual changes in the angle of attack of the associated airfoil, and hence the angle of attack of the aircraft.

As the airfoil and associated vane can be mounted almost anywhere on the aircraft, the flexibility of use of this system is increased and is not affected by air disturbances around the wing resulting from, for example, propeller-influenced airflow. Neither does it interfere with the wing construction or with apparatus, such as deicers, often provided on the wing. Moreover, the mounting of the sensing vane and its airfoil separate from the wing permits the use of this system, with its resulting advantages of increased accuracy of indication, on aircraft in which the wing structure would not permit the mounting of the vane thereon.

Different flight conditions, and particularly conditions such as flap position and thrust that vary the coefficient of lift, affect the maximum allowable angle of attack that will provide sufficient lift. For a given flap position, an increase in thrust increases the critical angle of attack for safe operation, and for a given value of thrust, the aircraft can operate safely at a higher angle of attack when the flaps are completely down than when the flaps are completely up.

In the system of the present invention, means are provided to present the angle of attack information to the pilot of the aircraft in a manner which is corrected for, and thus reflects, the actual conditions of flight. That information may be presented in terms of percent of stall by a single indication that is conformed to the instantaneous aircraft flight conditions. Means responsive to these flight conditions are provided to vary the relative angular orientation of the airfoil relative to the aircraft, thereby to produce a corresponding variation in the direction of airflow over that airfoil. The angle of attack reading provided by sensing the vane position is thus also modified. That reading, when presented in terms of percent of stall, can be directly read by the pilot without interpretation, and thus he is accurately apprised of the proximity of his aircraft to a stall condition for whatever flight conditions may be in existence. The airfoil varying means may, as described herein, comprise means effective to sense the flap position and the amount of thrust being delivered to the aircraft, and to produce signals in correspondence therewith. These signals are combined to produce an airfoil positioning signal that represents the correction of the angle of attack indication for the relevant sensed flight conditions.

In one embodiment of the present invention the airfoil is reoriented independently of the vane. In a second embodiment of the invention, the airfoil and vane are mounted on a common support that is articulated in response to the sensed flight conditions. The vane is free to pivot on that support. The vane and the airfoil are independently operatively connected to a variable electrical device to vary the electrical value thereof in response to both airfoil orientation and vane position. The signal produced by the electrical device is connected to a stall indicator, and thus corresponds to the sensed angle of attack as modified by the sensed existing slight conditions.

To the accomplishment of the above and to such other objects as may hereinafter appear, the present invention relates to an angle of attack sensing and indicating system, as defined in the appended claims taken together with the accompanying drawings in which:

In the aforementioned U.S. Pat. No. 3,190,115 there is a discussion of the results obtained by placing a vane which is sensitive to the direction of airflow in the airflow-deflection path of the aircraft wing. In brief, the air flow at the leading edge of the wing divides into two paths, one over the upper wing surface, the other under the lower wing surface. A relatively slight change in the direction of airflow over the wing is reflected in a substantially greater change in the direction of air movement over the vane. Means are provided to sense the relative rotational position of the vane and to provide an indication to the pilot in accordance therewith. That indication is thus an effectively magnified reading of the actual angle of attack of the wing with respect to the oncoming air.

The present invention makes use of this same principle of operation but instead of mounting the vane on the actual wing structure of the aircraft in the airflow-deflection path of the latter, the vane of the angle of the attack-measuring system of the present invention is mounted in the airflow-deflection path of a special associated airfoil mounted on the aircraft separate from the wing. This does two things. Structurally, it makes the mounting of the angle of attack sensing device less dependent on the particular structure of the aircraft, and hence enables the device to be used to planes where heretofore physical installation presented a problem. Operationally, it permits the sensing system to be refined so as to take into account varying flight conditions, this latter constituting a significant advantage even in those installations where no structural problems were presented.

Figure 1:
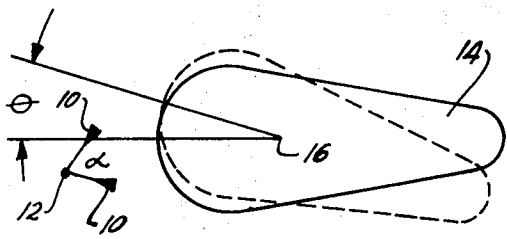
FIG. 1 is a diagrammatic representation of the vane and the airfoil of the present invention.

As shown in the diagram of FIG. 1, a vane 10 is pivotably mounted on an axis 12 in the airflow-direction path of an airfoil 14. Axis 12 is located in advance of vane 10 and is adjacent the leading edge of airfoil 14. The change in the direction of airflow over the vane 10 and thus its relative angular position $\alpha$ is a magnified version of the change of airflow direction over airfoil 14. The airfoil 14 is controllably pivotable through an angle $\theta$ about an axis 16 to change its relative angular orientation with respect to the aircraft, the degree of such variation being controlled in response to certain lift-modifying conditions of the aircraft, such as flap position and thrust. The angular movement of the airfoil 14 causes a corresponding change in the direction of airflow over the airfoil 14. This affects the position of vane 10, and thus modifies angle $\alpha$.

Figure 2:
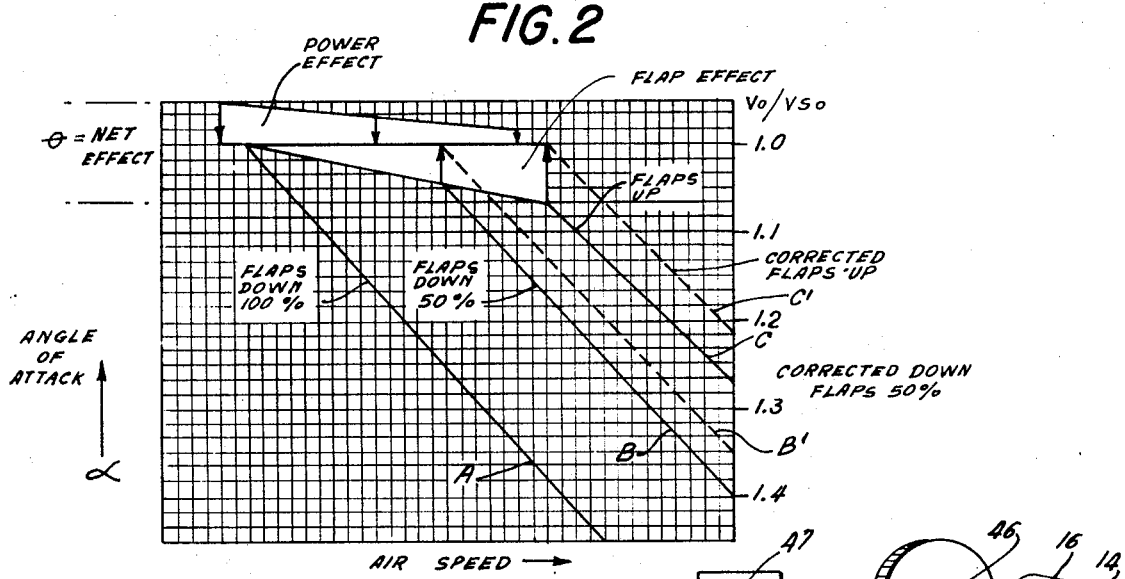
FIG. 2 is a graphical representation of airspeed as a function angle of attack for different flap conditions, illustrating the effects of flap position and thrust on the relation between angle of attack and percent of stall.

An indication of the aircraft angle of attack for any given set of flight conditions is most relevant to the pilot as an indication of how close the aircraft is to a stall condition. The graphical representation of FIG. 2 illustrates typical performance curves for an aircraft, in terms of the angle of attack $\alpha$, represented on the left hand ordinate, as a function of the airspeed represented on the abscissa, and in terms of the percent or ratio of stall, $Vo/Vso$, represented on the right hand ordinate. Three angle of attack vs. airspeed curves A, B and C are illustrated in FIG. 2 for a typical aircraft three positions of the flaps; curve A represents the angle of attack data when the flaps are completely down; curve B represents that data when the flaps are 50 percent down, and curve C represents that data when the flaps are completely up. The uppermost point in each curve represents the stall condition for the aircraft for that particular flap position, that is when the ratio $Vs/Vso$ is equal to unity. To insure sufficient lift on the aircraft, that ratio must be greater than unity and should preferably exceed 1.1. It is significant to note from FIG. 2 that the stall or $Vs/Vso = Vs/Vso$ condition occurs for a different value of the angle of attack for all three flap positions. The stall ratios provided along the right hand ordinate thus represent only the data for curve A, which is arbitrarily chosen as a reference, and varies substantially linearly with changes in the flap position between the completely up and completely down positions of the flaps.

Curves B and C are displaced vertically downward in the graph from the reference or flap 100 percent down condition (curve A) by a vertical distance represented by the vertical dimension of the right triangle designated "Flap Effect" in FIG. 2, which thus represents the effect of a change in flap position on the angle of attack vs. airspeed relationship.

Curves A, B and C are further modified as shown in FIG. 2 by the amount of thrust applied to the aircraft for all positions of the flaps. Thrust effect, which represents the increase in the lift provided by that value of thrust, is designated by a vertical displacement of the curves from its reference or zero thrust condition, that vertical distance being represented by the box labeled "Power Effect" in FIG. 2. As seen in FIG. 2, the effect of a given value of thrust on the relation between angle of attack and airspeed is greatest for the flaps completely down position (curve A) and is at a minimum when the flaps are completely up (curve C). Changes in the weight of the aircraft due to loading or increased gravity forces experienced during a single maneuver or the like, merely shift the angle of attack vs. airspeed curves A, B and C, along the horizontal axis of the graph. The relationship between angle of attack and percent of stall is thus independent of loading. That indication when expressed in terms of angle of attack is thus correct for all loading conditions of the aircraft.

The relation between angle of attack, airspeed and percent of stall is thus a complex one, depending as it does on both the flap position and thrust. A simple angle of attack indication, i.e. an indication of the relative angular position of vane 10, in and by itself, is thus not sufficient to provide the pilot with an instantaneous and reliable indication of how close the aircraft is to a stall condition, because it does not take into account the other lift-determining factors, i.e. thrust and flap position. The system of the present invention provides a single indication of the angle of attack (i.e. the position of vane 10) and presents that information in terms of percent of stall in a manner that is corrected automatically for all relevant (i.e. lift-modifying) flight conditions. This is accomplished by monitoring the flap position and thrust to produce a signal corresponding to the combined effect of these factors on the lift, and utilizing that signal to move the airfoil 14 through a corresponding angle $\theta$. That movement of airfoil 14 thus corrects for the net effect of these flight conditions on the angle of attack vs. airspeed curve by varying the effective "magnification" of the movement of vane 10, and effectively displaces curves B and C to new positions indicated respectively by the broken line curves B' and C' in which a stall condition ($Vs/Vso = 1.0$) occurs for the same angle of attack as for curve A. In this manner the indicated value of $\alpha$ is corrected in terms of percent of stall for all relevant flight conditions.

Figure 3:
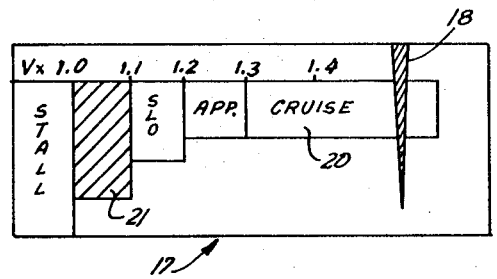
FIG. 3 is a typical dial which may be used with the system of the present invention to indicate the aircraft angle of attack in terms of percent of stall.

That indication may be proved as shown in FIG. 3 in the stall indicator 17 in which a pointer 18 is electrically operatively connected to the axis 12 of vane 10 in a manner to be more completely described below. For greater rotation of the vane 10 about axis 12 the angle of attack $\alpha$ measured by vane 10 is increased, and is reflected by a movement of pointer 18 to the left (as viewed in FIG. 3) along a dial 20 calibrated in decreasing values of percent of stall. By an examination of FIG. 2, an increased angle of attack for all conditions of flight brings the aircraft closer to a potential stall condition corresponding to pointer 18 approaching the 1.0 "percent" of stall indication on dial 20. Dial 20 may be arranged as shown with a plurality of sections each corresponding to a different flight maneuver, such as cruise and approach. The section 21 between the 1.0 and 1.1 reading is a danger zone and may be of a different color than the other sections. If desired an alarm may be actuated in the cockpit whenever the pointer 18 is in danger section 21.

Figure 4:
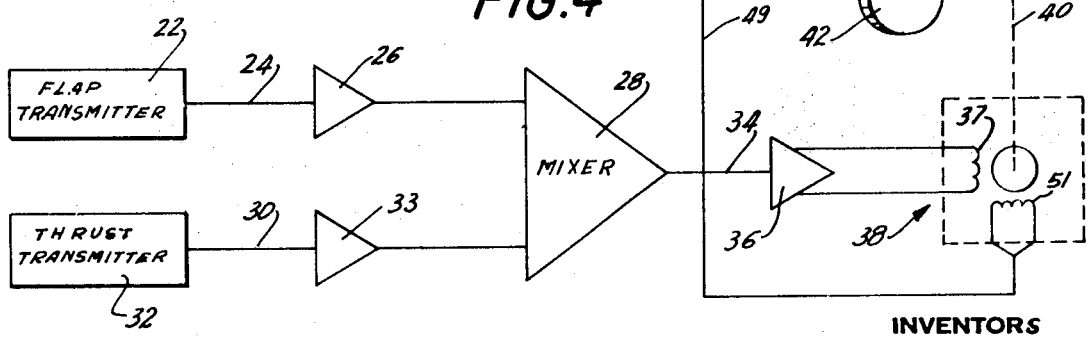
FIG. 4 is a schematic block diagram of the flight condition sensing and airfoil positioning system.

The manner in which vane 14 is angularly positioned in response to thrust and flap conditions is illustrated schematically in FIG. 4. The circuitry in FIG. 4 is shown only in block form, it being understood that such circuitry is well known by those skilled in the art and can be readily designed and modified for use with any particular aircraft.

The flap condition is sensed by a flap transmitter 22 which may conveniently be a potentiometer having a wiper arm operatively connected to the flap moving mechanism which produces an electrical signal at line 24 corresponding to the flap position. That signal is amplified in an amplifier 26 whose output is connected to one input of a mixer 28. The thrust signal is produced at line 30 by a thrust transmitter 32 which may be a potentiometer operatively connected to the throttle mechanism, a manifold pressure sensitive transducer, or any other device capable of producing an electrical signal proportional to thrust. That signal is amplified in amplifier 33 and is applied to the other input of mixer 28. The mixer output signal at line 34 corresponds to both input signals thereto and is thus proportional to both flap position and the thrust of the aircraft. Since the effects of thrust and flaps position on the coefficient of lift are opposite to one another the input signals are preferably summed 180° out of phase with one another, with suitable weighing and shaping circuitry being provided to conform to the relative effects of these conditions on lift. These relative effects will usually vary from one type of aircraft to another, and are empirically determined for each aircraft type. The output signal of mixer 28 is applied to a power amplifier 36 the output of which is connected to one control winding 37 of a synchro motor 38. The latter is operatively mechanically connected as by linkage 40 to a pinion 42 meshing with a gear 44 fast on a shaft 46 on which airfoil 14 is operatively secured. A signal proportional to the airfoil position is developed by sensor 47 and returned on line 49 to the other control winding 51 of motor 38, thereby to define a servo loop. That loop maintains airfoil 14 at a relative angular position proportional to the signal at line 34, which in turn is proportional to both flap position and thrust.

Figure 5:
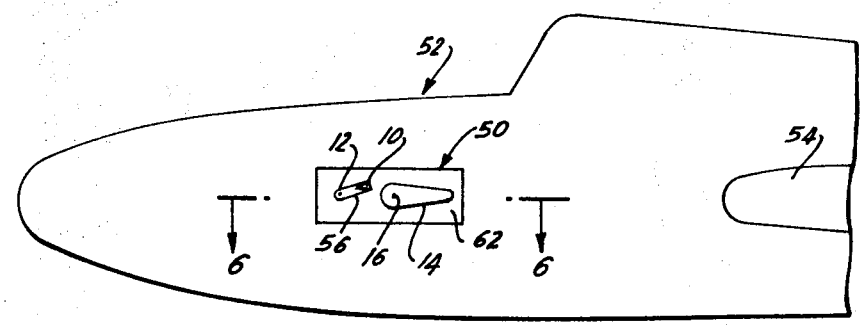
FIG. 5 is a side elevational view of the forward portion of an aircraft on which one embodiment of the angle of attack-measuring system of the present invention is mounted.
Figure 6:
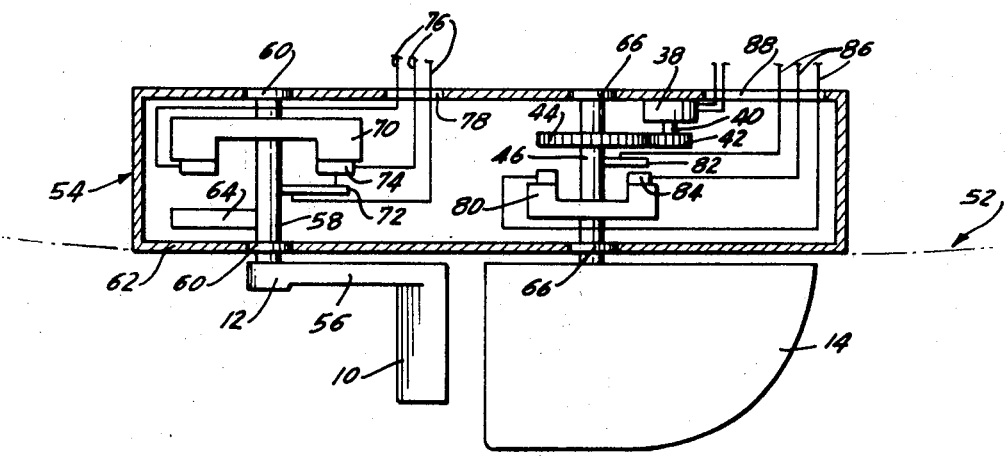
FIG. 6 is a cross sectional view on an enlarged scale taken along the line 6—6 of FIG. 5.

One practical embodiment of the angle of attack-measuring system of the present invention is illustrated in FIGS. 5 and 6 in which the system generally is shown mounted on an aircraft generally designated 52 having a wing 54. That system 50 is mounted on aircraft 52 in any appropriate location so long as that location is in a relatively undisturbed airflow path. As shown in FIG. 5 system 50 is mounted on the fuselage of aircraft 52 at a location forward of wing 54. The particular mounting location of system 50 is shown in FIG. 5 solely for illustrative purposes and it will be understood that any other location for mounting that system within the relatively undisturbed airflow path around aircraft 52 would be equally suitable for the purposes of this invention.

System 50 comprises the vane 10 mounted on the end of an arm 56 which in turn is secured to a shaft 58 defining axis 12. Shaft 58 is rotatably mounted in any suitable manner as by means of bearings 60 carried by the front and rear walls of a housing 62. A counterweight 64 may be mounted on shaft 58 within housing 62 opposite arm 56 and vane 10 to establish a normal, e.g. horizontal position of the vane. Housing 62 may be mounted in a recess provided therefor in a fuselage of aircraft 52 as shown in FIG. 6 to minimize interference with the aerodynamic performance of the aircraft.

Airfoil 14, which may have a cross section similar to that of wing 54, and which therefore breaks up the oncoming airflow over its upper and lower surfaces much as wing 54 does, is secured to the shaft 46 which is rotatably mounted in housing 62 as by bearings 66 carried in the front and rear walls of housing 62, shaft 46 defining axis 16.

To provide movement to pointer 18 a signal corresponding to the rotational position of vane 10 is transmitted to the indicator 17 by any appropriate means, preferably electrical for relative ease of transmission. To that end, as shown in FIG. 6, a potentiometer generally designated 70 is mounted within housing 62 and a brush 72 is secured to shaft 58, brush 72 being slidable along the electrically active element 74 of potentiometer 70. Suitable electrical leads 76 operatively connected to brush 72 and element 74 extend through an opening 78 in the rear wall of housing 62. Leads 76 extend into the interior of aircraft 52 to the indicator 17, that indicator including an appropriate voltage source and an indicating instrument, such as a galvanometer (not shown) to which pointer 18 is operatively connected. The position of pointer 18 represents the rotational position of shaft 58 and thus of vane 10. If desired an amplifier (not shown) may be interposed between potentiometer 70 and the galvanometer.

An indication of the components position of airfoil 14, preferably in the form of an electrical signal, must be produced and applied to the winding 51 of motor 38 to close the servo loop which positions airfoil 14 at its desired angular orientation. For this reason a potentiometer 80 (constituting the sensor 47 of FIG. 4) is mounted within the housing 62. Shaft 46 carries a brush 82 slidable along the electrically active element 84 of potentiometer 80. Leads 86 extending from brush 82 and potentiometer 80 pass through an opening 88 in housing 62 to the winding 51 of motor 38.

In the embodiment of the invention illustrated in FIGS. 5 and 6 the airfoil 14 is pivoted in response to flap and thrust conditions to vary the effective angle of attack reading (i.e. the position of pointer 18) provided by the position of vane 10. In a second embodiment of the invention illustrated in FIGS. 7–9, the airfoil and vane are pivoted as a unit to a common angular orientation in response to these flight conditions.

Figure 7:
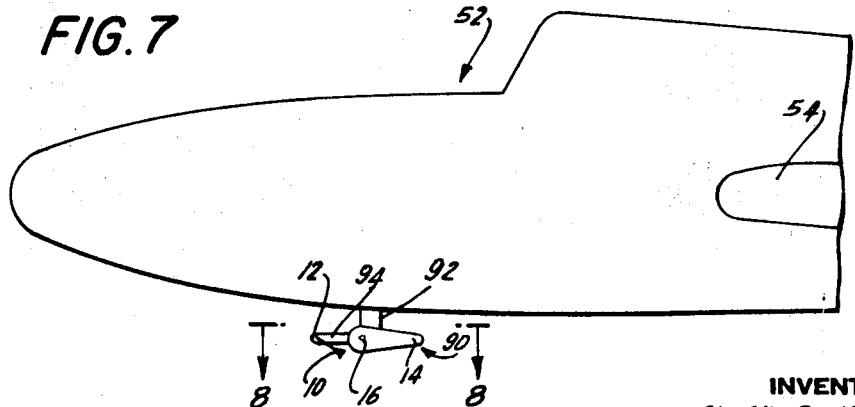
FIG. 7 is a view similar to FIG. 5 illustrating a second embodiment of the system of the present invention.
Figure 8:
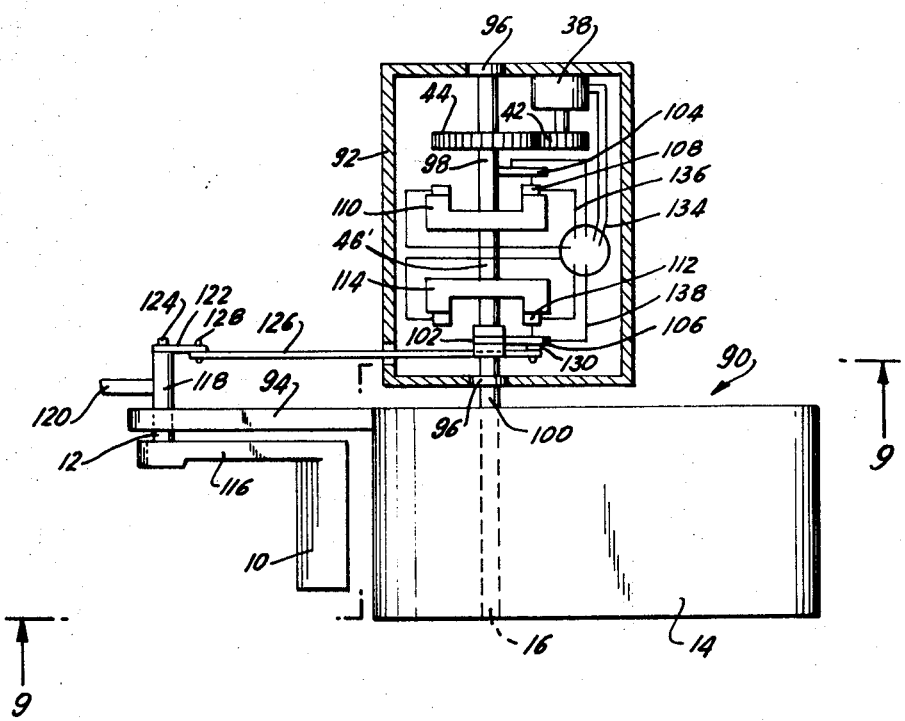
FIG. 8 is a cross-sectional view taken along the line 8—8 of FIG. 7.
Figure 9:
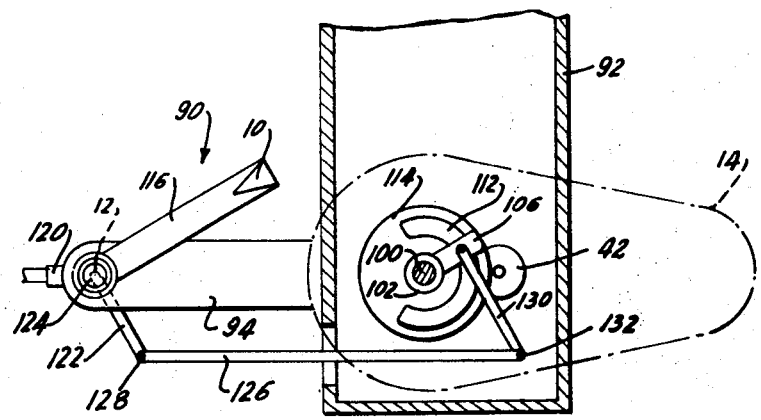
FIG. 9 is a cross-sectional view taken approximately along the line 9—9 of FIG. 8.

In the embodiment of FIGS. 7–9 the vane and airfoil unit generally designated 90 is suspended from the underside of aircraft 52 by means of a supporting strut 92 to which unit 90 is pivotally mounted. A pylon 94 extends from the forward end of airfoil 14 and the vane 10 is pivotally mounted on the forward end of the pylon. Strut 92 has a hollow interior in which the unit driving and sensing components including motor 38 and gears 42 and 44 are housed.

Airfoil 14 is mounted on a shaft 46' defining axis 16, which is journaled in bearing 96 provided in the walls of strut 92. Shaft 46' comprises a section 98 driven by gear 44 and a second section 100 rotatable with section 98. Airfoil 14 is fast on section 100. A brush 104 is mounted on section 98 and a second brush 106, axially spaced along shaft 46' from brush 104, is operatively secured to the shaft section 100 by a slip clutch 102. Brush 104 is adapted to move along and contact the electrically active element 108 of a potentiometer 110 and brush 106 is adapted to move along and contact the electrically active element 112 of a potentiometer 114.

Vane 10 is mounted on the end of an arm 116 which in turn is secured to a shaft 118. A counterweight 120 may be mounted on shaft 118 to maintain the vane in an equilibrium condition. Shaft 118, the rotational position of which represents the angular orientation of vane 10, is operatively connected to brush 106 through a linkage which comprises arm 122, secured to shaft 118 at 124, a second arm 126 pivotally connected to arm 122 at pin 128, and a third arm 130 pivotally connected to arm 126 at pin 132. Arm 130 is secured at its other end to brush 106. Electrical leads 134 connected to motor 38, and leads 136 and 138 connected to potentiometers 110 and 114 are respectively passed through an opening in strut 92 from where they are guided to the appropriate locations in the aircraft.

The electrical signal from amplifier 36 is applied to motor 38 to cause that motor to operate which in turn causes shaft sections 98 and 100 to rotate through the angle θ corresponding to the sensed flap and thrust conditions to cause unit 90 to rotate through substantially the same angle θ. That rotation causes brush 104 to move along element 108 to produce a shaft position signal that is connected via leads 136 to the control winding of motor 38. It also causes brush 106 to move along element 112 to produce a change in the output of potentiometer 114, which in turn produces a new angle of attack indication as provided by pointer 18. At the same time vane 10 rotates on shaft 118 through an angle corresponding to the instantaneous angle of attack of the aircraft as magnified by the airfoil 14. The rotational movement of shaft 118 is mechanically linked to brush 106 to cause the latter to move further along element 112 to further modify the angle of attack indicating electrical signal provided by potentiometer 114. The additional rotation provided to brush 106 as a result of the vane induced rotation of shaft 118 is independent of the position of shaft 46' as a result of operation of the slip clutch 102.

The angle of attack indication provided by the position of vane 10 is thus corrected to conform to the sensed flight conditions by the movement of airfoil 14 in two distinct ways. The first is similar to that of the earlier described embodiment in that the change in the relative angular orientation between the airfoil and the aircraft varies the degree by which the angular rotation of vane 10 is modified or magnified as described above. Second, the initial rotation of the airfoil itself, independent of the position of vane 10, is reflected by an augmented angle of attack signal from the potentiometer 114 caused by the initial movement of brush 106 upon the rotation of shaft 46'. As a result, the overall effect upon the angle of attack indication produced by the airfoil positioning signal is amplified still further.

By the provision of a separate airfoil, the angle of attack-sensing vane, the movement of which is magnified by that airfoil, may be mounted on the aircraft at any convenient location so long as it is in a substantially unobstructed path of airflow. The vane need no longer be mounted on the aircraft wing and may thus be employed with its attendant advantages on a great number of different types of aircraft with which it could not be utilized previously.

The angle of attack reading is presented to the pilot by a single, easy to read indication in terms of per cent of stall as this is the form of that data considered most useful to the pilot. By varying the relative angular orientation of the airfoil in response to specified flight conditions that angle of attack indication is accurately corrected to those flight conditions at all times. No longer must the pilot take into account such factors as load and airspeed and make an empirical estimate of lift as was formerly required to determine the margin of safety of the aircraft at a given time. By the use of the angle of attack measuring system of this invention, significant angle of attack information is presented directly to the pilot to enable him to make any adjustments to the aircraft such as increasing airspeed or thrust to move the angle of attack pointer toward the right of dial 20, i.e. away from the critical value of 1.1 which is dangerously near a stall condition.

The system of the present invention is relatively inexpensive to purchase and install, and can be used in a wide variety of aircraft with a minimum account of disturbance to the existing aircraft structure and electrical system. Only one additional dial need be placed in the cockpit to provide the pertinent information to the pilot, The flap transmitter 22, power transmitter 32, amplifiers 26, 33 and mixer 28 are all adjusted to the particular aircraft involved at the time of installation of the system in the aircraft to provide a stall indication for a range of flap and power conditions at the same indicated angle of attack. Once this has been done no further adjustments need be made to the system. The components of the system are rugged and relatively simple, and provide accurate information with a considerable degree of reliability.

While a number of embodiments of the present invention have been herein disclosed, it will be apparent that many variations may be made therein, all within the spirit and scope of the invention.

We claim:

1. A system for measuring the angle of attack of an aircraft having a wing, said system comprising an airfoil separate from said wing operatively secured to said aircraft in the path of airflow around said aircraft, a support operatively secured to said aircraft, a vane mounted on said support for pivoting about an axis defined by said support in response to changes in aircraft angle of attack and positioned in the airflow-deflection path of said airfoil, and sensing means operatively connected to said airfoil, and sensing means operatively connected to said vane to sense its pivoted position about said axis.

2. The system of claim 1, comprising means controllably varying the relative angular orientation of said airfoil with respect to the angle of attack of said aircraft, whereby the sensing of said system may be modified for different flight conditions of the aircraft.

3. A system as defined in claim 2, in which said varying means comprises means effective to sense and predetermine one of the flight conditions of the aircraft and to produce a signal corresponding thereto, and means operatively connected to said airfoil receiving said signal, and effective to position said airfoil at an annular orientation corresponding to said signal.

4. The system of claim 3, in which the sensed flight conditions comprise the relative position of the aircraft flaps and the value of the thrust of the aircraft.

5. The system of claim 4, in which the angular orientation of said airfoil is controllably variable independent of the position of said vane.

6. The system of claim 5, comprising a support operatively connected to the aircraft, means for operatively connecting said vane and said airfoil to said support, said airfoil varying means comprising means for varying the relative angular orientation of said support with respect to the aircraft.

7. The system of claim 6, comprising electrical means having a variable electrical property, indicating means operatively connected to said variable electrical means, means operatively connecting said vane to said variable electrical means for varying the value of the latter for variations in the relative angular orientation of said vane, and means operatively connecting said airfoil-varying means to said variable electrical means for varying the value of the latter for variations in the angular orientation of the former.

8. The system of claim 2, in which the angular orientation of said airfoil is controllably variable independent of the position of said vane.

9. The system of claim 8, comprising a support operatively connected to the aircraft, means for operatively connecting said vane and said airfoil to said support, said airfoil-varying means comprising means for varying the relative angular orientation of said support with respect to the aircraft.

10. The system of claim 9, comprising electrical means having a variable electrical property, indicating means operatively connected to said variable electrical means, means operatively connecting said vane to said variable electrical means for varying the value of the latter for variations in the relative angular orientation of said vane, and means operatively connecting said airfoil-varying means to said variable electrical means for varying the value of the latter for variations in the angular orientation of the former.

11. The system of claim 1, in which said axis is located in advance of said vane and adjacent the leading edge of said airfoil.

12. The system of claim 11, comprising means for controllably varying the relative angular orientation of said airfoil section with respect to said aircraft, whereby the sensing of said system may be modified for different flight conditions of the aircraft.

13. A system for measuring the angle of attack of an aircraft having a wing, said system comprising an airfoil operatively secured to said aircraft in the path of airflow around said aircraft, said airfoil being positioned to change in angle of attack when the wing changes in angle of attack, means operatively mounted on said aircraft in the airflow-deflection path of said airfoil and in advance of said airfoil in respect to normal airflow over said airfoil and effective to produce an indication of the relative direction of air flow over said airfoil, and means operatively connected to said airfoil and effective to vary its angular orientation relative to said aircraft, whereby the indication of said system may be modified for different flight conditions of the aircraft.

14. A system as defined in claim 13, in which said varying means comprises means effective to sense and predetermine one of the flight conditions of the aircraft and to produce a signal corresponding thereto, and means operatively connected to said airfoil, receiving said signal, and effective to position said airfoil at an angle of attack orientation corresponding to said signal.

15. The system of claim 14, in which the sensed flight conditions comprise the relative position of the aircraft flaps and the value of the thrust of the aircraft.

16. The system of claim 15, in which the angular orientation of said airfoil is controllably variable independent of the position of said vane.

17. The system of claim 15, comprising a support operatively connected to the aircraft, means for operatively connecting said vane and said airfoil to said support, said airfoil-varying means comprising means for varying the relative angular orientation of said support with respect to the aircraft.

18. The system of claim 16, comprising a support operatively connected to the aircraft, means for operatively connecting said vane and said airfoil to said support, said airfoil varying means comprising means for varying the relative angular orientation of said support with respect to the aircraft.

19. The system of claim 18, comprising electrical means having a variable electrical property, indicating means operatively connected to said variable electrical means, means operatively connecting said vane to said variable electrical means for varying the value of the latter for variations in the relative angular orientation of said vane, and means operatively connecting said airfoil varying means to said variable electrical means for varying the value of the latter for variations in the angular orientation of the former.

20. The system of claim 13, in which the angular orientation of said airfoil is controllably variable independent of the position of said vane.

21. The system of claim 20, comprising a support operatively connected to the aircraft, means for operatively connecting said vane and said airfoil to said support, said airfoil varying means comprising means for varying the relative angular orientation of said support with respect to the aircraft.

22. The system of claim 21, comprising electrical means having a variable electrical property, indicating means operatively connected to said variable electrical means, means operatively connecting said vane to said variable electrical means for varying the value of the latter for variations in the relative angular orientation of said vane, and means operatively connecting said airfoil varying means to said variable electrical means for varying the value of the latter for variations in the angular orientation of the former.

23. The system of claim 20, comprising a support operatively connected to the aircraft, a shaft rotatably mounted in said support and having one end extending therefrom, means operatively securing said airfoil to said shaft end, means operatively connected to and extending from the front end of said airfoil, and means rotatively mounting said vane on said extending means at a location spaced from the front end of said airfoil.

24. The system of claim 23, comprising electrical means having a variable electrical property, indicating means operatively connected to said variable electrical means, means operatively connecting said vane to said variable electrical means for varying the value of the latter for variations in the relative angular orientation of said vane, and means operatively connecting said airfoil-varying means to said variable electrical means for varying the value of the latter for variations in the angular orientation of the former.

25. The system of claim 13, in which said axis is located in advance of said vane and adjacent the leading edge of said airfoil.

PO-1050
(5/69)

UNITED STATES PATENT OFFICE
CERTIFICATE OF CORRECTION

Patent No. 3,604,259            Dated September 14, 1971

Inventor(s) Allan B. Heinsohn et al

It is certified that error appears in the above-identified patent and that said Letters Patent are hereby corrected as shown below:

Assignee Rosemount Engineering Company St. Eden, Prairie, Minn. should be--Rosemount Engineering Company, Eden Prairie, Minn. Column 3, line 51 slight should be--flight; Column 3, line 60 angle should be--of angle--. Column 4, line 28 used to should be--used on--; Column 4, line 70 =Vs/Vso should be--=1.0-- Column 6, line 18 weighing should be--weighting--. Column 7, line 6 components should be--angular--. Column 8, lines 68 and 69 (Claim 1, lines 8 and 9) delete "and sensing means operatively connected to said airfoil,". Column 9, lines 64 and 65 (Claim 13, lines 11 and 12) indication should be--indicating--.

Signed and sealed this 2nd day of May 1972.

(SEAL)
Attest:

EDWARD M. FLETCHER, JR.            ROBERT GOTTSCHALK
Attesting Officer                          Commissioner of Patents